United States Patent
Shinohara et al.

(10) Patent No.: US 8,900,456 B2
(45) Date of Patent: Dec. 2, 2014

(54) METHOD OF TREATING A PLANT WASTEWATER AND TREATMENT SYSTEM THEREFOR

(75) Inventors: Masayo Shinohara, Yokohama (JP); Kazuhige Kawamura, Yokohama (JP); Hiromi Satoh, Yokohama (JP); Toshinobu Imahama, Yokohama (JP); Atsushi Kitanaka, Otsu (JP); Masahide Taniguchi, Otsu (JP)

(73) Assignees: Chiyoda Corporation (JP); Toray Industries, Inc. (JP)

( * ) Notice: Subject to any disclaimer, the term of this patent is extended or adjusted under 35 U.S.C. 154(b) by 460 days.

(21) Appl. No.: 13/499,330

(22) PCT Filed: Sep. 1, 2010

(86) PCT No.: PCT/JP2010/064949
§ 371 (c)(1),
(2), (4) Date: Mar. 30, 2012

(87) PCT Pub. No.: WO2011/043144
PCT Pub. Date: Apr. 14, 2011

(65) Prior Publication Data
US 2012/0181229 A1 Jul. 19, 2012

(30) Foreign Application Priority Data
Oct. 9, 2009 (JP) ................................ 2009-235124

(51) Int. Cl.
*C02F 3/30* (2006.01)
*B01D 61/02* (2006.01)
*B01D 61/04* (2006.01)
*C02F 103/36* (2006.01)
*C02F 1/44* (2006.01)

(52) U.S. Cl.
CPC ............... *B01D 61/04* (2013.01); *C02F 3/308* (2013.01); *C02F 2103/365* (2013.01); *B01D 2311/108* (2013.01); *B01D 61/025* (2013.01); *C02F 1/441* (2013.01); *B01D 2311/04* (2013.01)
USPC ........... 210/603; 210/605; 210/617; 210/623; 210/259

(58) Field of Classification Search
CPC .... C02F 2103/365; C02F 1/441; C02F 3/308; B01D 61/04; B01D 2311/08; B01D 61/025; B01D 2311/04
USPC ......... 210/605, 615, 616, 617, 621, 623, 252, 210/259, 903, 906
See application file for complete search history.

(56) References Cited

U.S. PATENT DOCUMENTS

2002/0189173 A1* 12/2002 Staschik ........................ 52/79.1
2008/0116130 A1* 5/2008 Devine ........................... 210/605

FOREIGN PATENT DOCUMENTS

JP      52-03375 A    8/1977
JP      52-103375 A   8/1977

(Continued)

OTHER PUBLICATIONS

Machine-generated English translation of JP 2005-536325, generated on Aug. 19, 2014.*

*Primary Examiner* — Fred Prince
(74) *Attorney, Agent, or Firm* — DLA Piper LLP (US)

(57) ABSTRACT

A method of treating wastewater containing an organic compound includes feeding wastewater to an anoxic tank, adding compounds containing nitrogen and phosphorus components to wastewater, performing anaerobic treatment on wastewater, and discharging treated wastewater as pre-treated water; introducing pre-treated water into an anaerobic treatment tank, performing anaerobic treatment on pre-treated water, thereby decomposing the organic compound into organic compounds of smaller molecular size and a mixture gas containing methane and carbon dioxide, and discharging treated water as primary water; introducing primary water into an aerobic treatment tank, performing aerobic treatment on primary water, and discharging treated water through a solid-liquid separator as secondary water; and introducing at least a part of secondary water into a reverse osmosis membrane separation unit, and separating part of secondary water into RO permeated water and RO concentrated brine, wherein at least a part of RO concentrated brine is recycled to the anoxic tank.

12 Claims, 1 Drawing Sheet

(56) References Cited

FOREIGN PATENT DOCUMENTS

| JP | 4-061999 A | 2/1992 |
|---|---|---|
| JP | 5-309391 A | 11/1993 |
| JP | 2003-071487 A | 3/2003 |
| JP | 2005-536325 A | 12/2005 |
| JP | 2005-536326 A | 12/2005 |
| JP | 2007-021457 A | 2/2007 |
| JP | 2007-229623 A | 9/2007 |
| JP | 2007-268369 A | 10/2007 |
| WO | 03/106351 A1 | 12/2003 |
| WO | 2006/043726 A1 | 4/2006 |

* cited by examiner

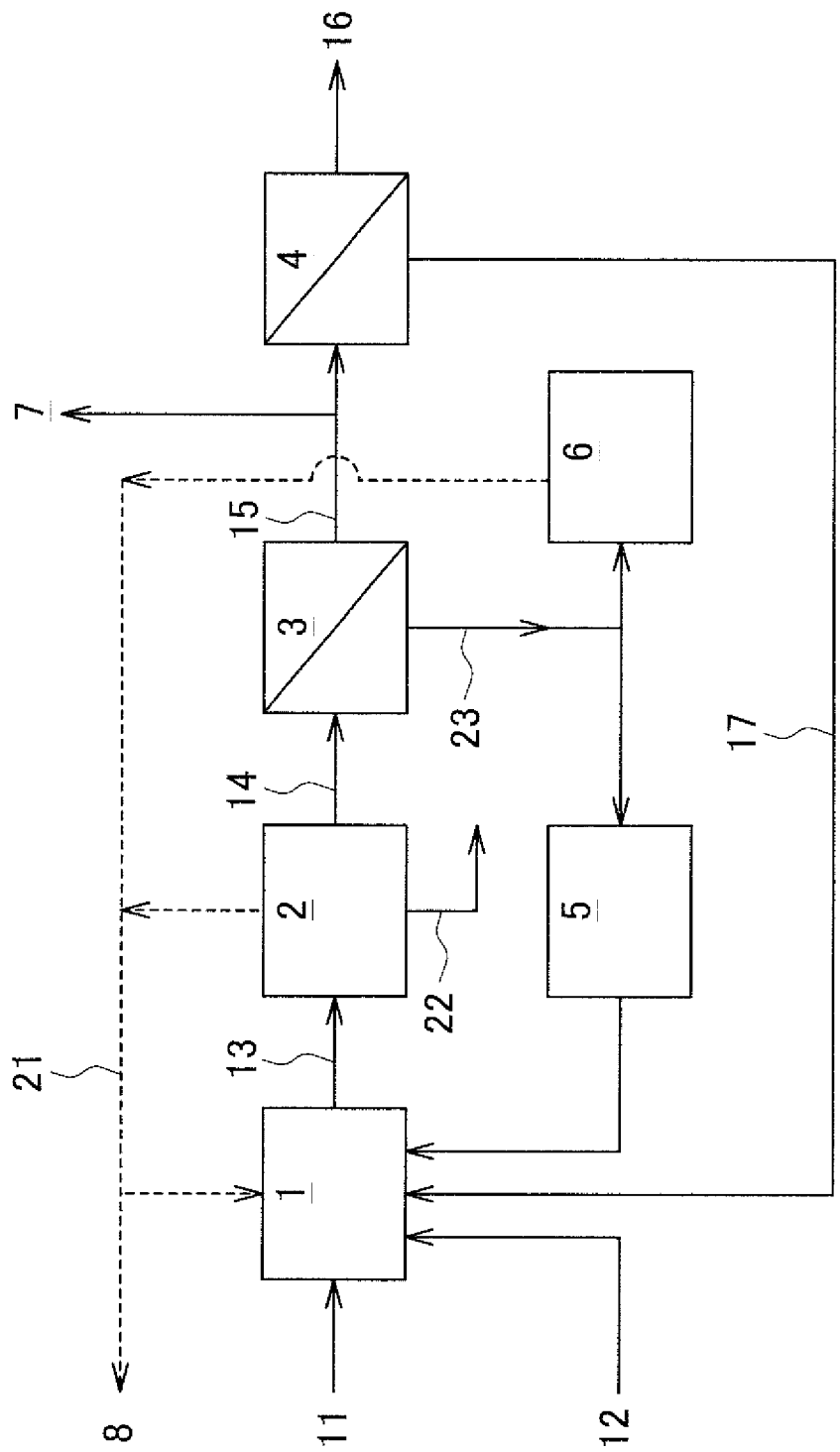

METHOD OF TREATING A PLANT WASTEWATER AND TREATMENT SYSTEM THEREFOR

RELATED APPLICATIONS

This is a §371 of International Application No. PCT/JP2010/064949, with an international filing date of Sep. 1, 2010 (WO 2011/043144 A1, published Apr. 14, 2011), which is based on Japanese Patent Application No. 2009-235124, filed Oct. 9, 2009, the subject matter of which is incorporated by reference.

TECHNICAL FIELD

This disclosure relates to a method of treating a plant wastewater and a treatment system therefor. More specifically, the disclosure relates to a method of treating a plant wastewater and a treatment system therefor which allow reduction in treatment costs for anaerobic and aerobic biological treatments on a plant wastewater containing a nitrogen component and/or a phosphorus component either in amounts insufficient for the biological treatments or not at all.

BACKGROUND

Recently, as effective uses of water resources, especially recycling uses thereof have been emphasized, purification treatments of wastewater and sewage water have been proposed. Among those, purification methods have been known in which water containing an organic compound is subjected to anaerobic and aerobic biological treatments for decomposing and removing the organic compound.

For example, PCT International Publication No. WO 03/106351 A1 proposes the production of a highly purified water by subjecting a large amount of by-product water by-produced in the Fischer-Tropsch process to a purification process including a biological treatment using anaerobic microorganisms and/or aerobic microorganisms. However, such by-product water synthesized in the Fischer-Tropsch process contains nitrogen and phosphorus components, which serve as nutrients for anaerobic microorganisms and aerobic microorganisms, either not at all or in amounts insufficient for the biological treatments. Accordingly, it is necessary to constantly add compounds containing nitrogen and phosphorus components. Likewise, plant wastewater discharged from chemical plants, petroleum plants, and petrochemical plants adopting processes other than the Fischer-Tropsch process contains nitrogen and phosphorus components either in amounts insufficient for the biological treatments or not at all. For this reason, when such a plant wastewater is subjected to biological treatments, it is necessary to constantly add compounds containing nitrogen and phosphorus components as nutrients for microorganisms for the biological treatments. Addition of the compounds containing nitrogen and phosphorus components as described above has been a cause of increased treatment costs for anaerobic and aerobic biological treatments of a plant wastewater.

It could therefore be helpful to provide a method of treating a plant wastewater and a treatment system therefor which allow treatment costs to be reduced for anaerobic and aerobic biological treatments on a plant wastewater containing a nitrogen component and/or a phosphorus component either in amounts insufficient for the biological treatments or not at all.

SUMMARY

We thus provide a method of treating plant wastewater including a pre-treatment step of feeding the plant wastewater to an anoxic tank, adding compounds containing a nitrogen component and a phosphorus component to the plant wastewater, performing an anaerobic biological treatment on the plant wastewater, and discharging the thus treated plant wastewater as pre-treated water; a primary treatment step of introducing the pre-treated water into an anaerobic biological treatment tank, performing an anaerobic biological treatment on the pre-treated water, thereby decomposing the organic compound into organic compounds of smaller molecule and a mixture gas containing methane and carbon dioxide, and discharging the thus treated water as primary treated water; a secondary treatment step of introducing the primary treated water into an aerobic biological treatment tank, performing an aerobic biological treatment on the primary treated water, and discharging the thus treated water through solid-liquid separation means as secondary treated water; and a tertiary treatment step of introducing at least a part of the secondary treated water into a reverse osmosis membrane separation unit, and separating the part of the secondary treated water into RO permeated water and RO concentrated brine. In the method of treating a plant wastewater, at least a part of the RO concentrated brine is recycled to the anoxic tank.

For the above plant wastewater containing the organic compound, by-product water discharged from a plant using the Fischer-Tropsch process is applicable. For the above anaerobic biological treatment tank, a treatment tank of an upflow anaerobic sludge blanket (UASB) is preferable. For the above aerobic biological treatment tank, an aerobic biological treatment tank including solid-liquid separation means (MBR; Membrane Bioreactor) is preferable.

Further, it is preferable that at least a part of excess sludge discharged from the aerobic biological treatment tank be solubilized, and then added to the anoxic tank. At least a part of the mixture gas containing methane and carbon dioxide and being discharged in the primary treatment step can be recycled to the anoxic tank, and used for bubbling the plant wastewater thereto and/or can be recycled to the any one of the chemical plant, the petroleum plant, and the petrochemical plant.

A treatment system for a plant wastewater discharged from any one of a chemical plant, a petroleum plant, and a petrochemical plant and containing an organic compound includes an anoxic tank configured so that the plant wastewater is introduced into the anoxic tank, compounds containing a nitrogen component and a phosphorus component is added to the plant wastewater, thereby subjecting the plant wastewater to an anaerobic biological treatment, and the thus treated plant wastewater is discharged from the anoxic tank as pre-treated water; an anaerobic biological treatment tank communicating with the anoxic tank and being configured so that the pre-treated water is introduced into the anaerobic biological treatment tank for being subjected to an anaerobic biological treatment, the organic compound in the pre-treated water is decomposed into organic compounds of smaller molecule and a mixture gas containing methane and carbon dioxide, and the thus treated water is discharged from the anaerobic biological treatment tank as primary treated water; an aerobic biological treatment tank communicating with the anaerobic biological treatment tank and being configured so that the primary treated water is introduced into the aerobic biological treatment tank for being subjected to an aerobic biological treatment, and the thus treated water is discharged through solid-liquid separation means from the aerobic biological treatment tank as secondary treated water; a reverse osmosis membrane separation unit communicating with the aerobic biological treatment tank and being configured to separate the secondary treated water into RO permeated water and RO concentrated brine; and a recycling line for recycling at least a part of the RO concentrated brine to the anoxic tank.

The anaerobic biological treatment tank is preferably a treatment tank of an upflow anaerobic sludge blanket (UASB), and the aerobic biological treatment tank is preferably an aerobic biological treatment tank including solid-liquid separation means (MBR; Membrane Bioreactor).

The treatment system for a plant wastewater preferably includes: piping for recycling at least a part of excess sludge from the aerobic biological treatment tank to the anoxic tank; and solubilizing means for solubilizing the excess sludge, the solubilizing means being provided in a middle of the piping. The solubilizing means enables the reduction in the amount of the excess sludge, and the reduction in the addition amounts of the biological nutrients (the nitrogen component and the phosphorus component) additionally added.

Further, it is preferable that the treatment system includes piping for recycling to the anoxic tank a mixture gas containing methane and carbon dioxide and being discharged from the anaerobic biological treatment tank, and, in the treatment system for a plant wastewater, the anoxic tank includes bubbling means using the mixture gas.

The anaerobic biological treatments in the anoxic tank and the anaerobic biological treatment tank as well as the aerobic biological treatment in the aerobic biological treatment tank are performed while the compounds containing nitrogen component and phosphorus component are added to the plant wastewater containing the organic compound. Therefore, the organic compound is removed from the secondary treated water discharged from the aerobic biological treatment tank. As a result, the secondary treated water contains a trace amount of organic substances and the nitrogen component and the phosphorus component which have been added as nutrients for microorganisms. This secondary treated water is separated with a reverse osmosis membrane into the RO permeated water free from the dissolved substances and the RO concentrated brine. In addition, the RO concentrated brine containing the nitrogen component and the phosphorus component is recycled to the anoxic tank. Accordingly, the amounts of the nitrogen and phosphorus components to be additionally added can be reduced. Therefore, the treatment costs of the biological treatments can be reduced.

Moreover, the treatment system for a plant wastewater includes the piping for recycling the RO concentrated brine discharged from the reverse osmosis membrane separation unit to the anoxic tank. Accordingly, the amounts of biological nutrients to be added to the plant wastewater can be reduced. Therefore, the treatment costs of the biological treatments can be reduced.

BRIEF DESCRIPTION OF THE DRAWING

FIG. 1 is a schematic diagram showing an example of a treatment system used in a method of treating a plant wastewater.

EXPLANATION OF THE REFERENCE NUMERALS 1 anoxic tank
2 anaerobic biological treatment tank
3 aerobic biological treatment tank
4 reverse osmosis membrane separation unit
5 solubilizing means
11 plant wastewater
12 compounds containing nitrogen component and phosphorus component
13 pre-treated water
14 primary treated water
15 secondary treated water
16 RO permeated water
17 RO concentrated brine
21 mixture gas containing methane and carbon dioxide
23 excess sludge

DETAILED DESCRIPTION

FIG. 1 is a schematic diagram showing an example of a treatment system used in a method of treating a plant wastewater.

In FIG. 1, the reference numeral 1 denotes an anoxic tank, the reference numeral 2 denotes an anaerobic biological treatment tank, the reference numeral 3 denotes an aerobic biological treatment tank, and the reference numeral 4 denotes a reverse osmosis membrane separation unit (an RO membrane separation unit). Note that the anoxic tank and the anaerobic biological treatment tank are both tanks in which an anaerobic biological treatment is performed. An upstream treatment tank is referred to as the anoxic tank, while a downstream treatment tank is referred to as the anaerobic biological treatment tank.

In the treatment system for a plant wastewater, the anoxic tank 1 includes means for adding compounds 12 containing nitrogen component and phosphorus component and bubbling means for introducing an anaerobic gas. The bubbling with the anaerobic gas is preferable because it brings the anoxic tank 1 close to an anoxic state. Anaerobic microorganisms exist in the anoxic tank 1, and perform an anaerobic biological treatment on organic compounds, while ingesting the compounds 12 containing nitrogen component and phosphorus component.

The anaerobic biological treatment tank 2 communicates with the anoxic tank 1 at a downstream thereof. Pre-treated water 13 discharged from the anoxic tank 1 is introduced into the anaerobic biological treatment tank 2, where another anaerobic biological treatment is performed on the pre-treated water 13. The anaerobic biological treatment tank 2 is preferably an upflow anaerobic sludge blanket (UASB). The UASB is commonly used as an anaerobic biological treatment apparatus, and achieves a high efficiency in biological decomposition.

The aerobic biological treatment tank 3 communicates with the anaerobic biological treatment tank 2 at a downstream thereof. Primary treated water 14 discharged from the anaerobic biological treatment tank 2 is introduced into the aerobic biological treatment tank 3, where an aerobic biological treatment is performed on the primary treated water 14. The aerobic biological treatment tank 3 is preferably an aerobic biological treatment tank having solid-liquid separation means (MBR; Membrane Bioreactor). The MBR is commonly used as an aerobic biological treatment apparatus, and includes a diffuser tube for aerating the tank and solid-liquid separation means.

The reverse osmosis membrane separation unit 4 communicates with the aerobic biological treatment tank 3 at a downstream thereof. Secondary treated water 15 discharged from the aerobic biological treatment tank 3 is fed to the reverse osmosis membrane separation unit 4, and separated into RO permeated water 16 and RO concentrated brine 17. The reverse osmosis membrane separation unit 4 is connected to the anoxic tank 1 through piping. Through the piping, the RO concentrated brine 17 is recycled from the reverse osmosis membrane separation unit 4 to the anoxic tank 1 to be added as nutrients for the microorganisms.

In the treatment method, plant wastewater 11 is subjected to the anaerobic biological treatments in the anoxic tank 1 and in the anaerobic biological treatment tank 2, and to the aerobic biological treatment in the aerobic biological treatment tank 3. After being subjected to the liquid-solid separation, the plant wastewater 11 is regenerated as the RO permeated water 16, which is highly purified in the reverse osmosis membrane separation unit 4. The plant waste-water 11 to be treated is wastewater discharged from a chemical plant, a petroleum plant, or a petrochemical plant. Examples of the plant wastewater discharged from a chemical plant include wastewater produced as a by-product of a chemical reaction, such as by-product water produced in a plant adopting the Fischer-Tropsch process, and wash water used in purifying a main product. Moreover, wastewater used for washing a reactor or a facility can be treated as well.

Containing an organic compound, the plant wastewater 11 cannot be used as raw water to be treated into pure water or drinking water, or agricultural water. In addition, use of the plant wastewater 11 as industrial water also has a limitation. The organic compound is not particularly limited, but may be a lower hydrocarbon or a water-soluble oxygen-containing hydrocarbon. Examples thereof include alcohols, ketones, aldehydes, organic acids, and the like. Only one kind of these organic compounds or a combination of multiple kinds thereof may be contained in the plant wastewater 11.

An anaerobic biological treatment and an aerobic biological treatment are performed to decompose and remove an organic compound in a plant wastewater. However, unlike wastewater from food plants or human sewage, the aforementioned plant wastewater hardly contains nitrogen, phosphorus, and potassium, which are major nutrient elements for microorganisms. In biological treatment of such a plant wastewater, it is necessary to supplement nitrogen component and phosphorus component, which are major nutrients for anaerobic microorganisms and aerobic microorganisms.

The compounds 12 containing nitrogen and phosphorus components are added to the anoxic tank 1 as nutrients. Examples of the nitrogen component include urea, ammonium salt, nitrate, and the like. Meanwhile, examples of the phosphorus component include phosphate, hydrogen phosphate, and the like. Note that, since the amount of potassium demanded is extremely small, no particular addition thereof is necessary.

Oxygen in the plant wastewater 11 fed to the anoxic tank 1 is removed when the plant wastewater 11 is exposed to the anaerobic gas. The anaerobic gas is a gas containing no oxygen, and examples thereof include nitrogen, methane, and carbon dioxide. These gases may be used alone or as a mixture gas of two or more kinds A mixture gas containing methane and carbon dioxide is preferable.

In this anoxic state, the anaerobic microorganisms decompose biologically the organic compound contained in the plant wastewater, thereby causing molecular weight reduction and/or oxidation of the organic compound. Specifically, in the course of biodegradation of the organic compound by the anaerobic microorganisms, the organic compound is made more decomposable by cleavage of the main chain thereof and oxidation into an organic acid. These steps are included in a pre-treatment step in the treatment method. The water treated in the pre-treatment step is discharged as the pre-treated water 13.

In the subsequent primary treatment step, the pre-treated water 13 is introduced into the anaerobic biological treatment tank 2, where another anaerobic biological treatment is performed on the pre-treated water 13. The anaerobic biological treatment tank 2 is preferably a treatment tank of an upflow anaerobic sludge blanket (UASB). As a result of anaerobic biological decomposition in the UASB, the organic compound subjected to the molecular weight reduction and/or the oxidation is decomposed into organic compounds having smaller molecular weight and methane and carbon dioxide, and methane and carbon dioxide are discharged as a mixture gas 21. Meanwhile, anaerobic microorganisms 22 which have proliferated in the UASB to become excessive can be taken out as appropriate and stored for reuse. The water treated in the primary treatment step is discharged as the primary treated water 14.

In a secondary treatment step, the primary treated water 14 is introduced into the aerobic biological treatment tank 3, and subjected to an aerobic biological treatment. The aerobic biological treatment tank 3 is preferably an aerobic biological treatment tank including solid-liquid separation means (MBR; Membrane Bioreactor). The MBR includes a diffuser tube which is used for aeration. Accordingly, the organic compounds with smaller molecular weight remaining in the primary treated water 14 are decomposed by the aerobic biological treatment. The treated water thus subjected to the aerobic biological treatment is separated by the solid-liquid separation means equipped in the tank of the MBR, and discharged as the secondary treated water 15. As the liquid-solid separation method, membrane separation is preferable. A separation membrane for the liquid-solid separation method may be any separation membrane as long as the separation membrane has a pore diameter smaller than the sizes of the aerobic microorganisms. Examples of the separation membrane include ultrafiltration membranes (UF membranes) and microfiltration membranes (MF membranes). In the MBR, the aerobic microorganisms proliferate rapidly to reach a state of excessive amount. For this reason, it is preferable to adjust the concentration of the aerobic microorganisms by taking out the excess aerobic microorganisms as excess sludge 23.

As a tertiary treatment step, at least a part of the secondary treated water 15 is fed to the reverse osmosis membrane separation unit 4. The rest of the secondary treated water 15 is used as process water 7 for a cooling tower or the like. The secondary treated water 15 fed to the reverse osmosis membrane separation unit 4 is purified to be RO permeated water 16 free from dissolved substances. The RO permeated water 16 can be used as raw water to be treated into pure water or drinking water, or agricultural water. The RO permeated water 16 may also be used as industrial water. Meanwhile, dissolved substances in the secondary treated water 15 are discharged as the RO concentrated brine 17. The dissolved substances include residual products of the organic compound, a nitrogen compound, a phosphorus compound, and the like.

In the treatment method, at least a part of the RO concentrated brine 17 discharged from the reverse osmosis membrane separation unit 4 is recycled to the anoxic tank 1 for the pretreatment step. Containing nitrogen and phosphorus compounds, the RO concentrated brine 17 can be used as nutrients for the anaerobic microorganisms and the aerobic microorganisms. As a result, the amount of the compounds 12, which contain nitrogen component and phosphorus component, to be added to the anoxic tank 1 can be reduced by preferably 20% to 60%, and more preferably 30% to 50%.

Moreover, in the secondary treatment step, the excess sludge 23 discharged from the aerobic biological treatment tank can be used as nutrients for the anaerobic microorganisms and the aerobic microorganisms. To this end, the excess sludge 23 is preferably solubilized. In other words, the shells (cell walls) of the aerobic microorganisms, which constitute the excess sludge 23, are preferably destroyed or dissolved to make the excess sludge 23 easily taken in by the microorganisms as nutrients. This further reduces the amount of the compounds 12, which contain nitrogen component and phosphorus component, to be added to the anoxic tank 1. As the method for solubilizing the excess sludge 23, any ordinary method can be used. Examples thereof include a method of treating the excess sludge 23 with an alkali such as an aqueous sodium hydroxide solution, a method of crushing the excess sludge 23 by using a wet mill, a method of freezing the excess sludge 23, a method of ultrasonically treating the excess sludge 23, and a method of treating the excess sludge 23 with ozone, and the like.

Meanwhile, the rest of the excess sludge 23 can be introduced into a methane fermentation tank 6, and subjected to an anaerobic biological treatment. As a result, the excess sludge 23 is decomposed into a mixture gas containing methane and carbon dioxide, which is then discharged.

The mixture gas 21 containing methane and carbon dioxide and being discharged from the anaerobic biological treatment tank 2 and/or the methane fermentation tank 6 can be recycled to the anoxic tank 1, and used as the anaerobic gas for the bubbling. This reduces the costs of the biological treatments. Alternatively, the mixture gas 21 may be recycled to a main plant 8 which is a chemical plant, a petroleum plant, or a petrochemical plant. The composition ratio in the mixture gas discharged from the anaerobic biological treatment tank 2 is as follows: $CH_4/CO_2=8/2$ to $7/3$. Thus, the mixture gas can be used as it is as a raw material for producing syngas of $H_2/CO$ mole ratio=2 from natural gas. The syngas of $H_2/CO$ mole ratio=2 is suitable for Fischer-Tropsch synthesis. To which of the anoxic tank 1 and the main plant 8 the mixture gas 21 should be recycled or what recycling ratio should be employed when the mixture gas 21 is recycled to the both can be selected as appropriate depending on the composition of the mixed gas 21 and the operational conditions at that time.

Hereinafter, our methods and treatment systems will be described in further details on the basis of an example. However, the disclosure is not limited to the example.

EXAMPLE

By using a treatment system for a plant wastewater having the configuration shown in FIG. 1, a plant wastewater by-produced in the Fischer-Tropsch process was treated for purification. The feeding rate of the plant wastewater was 500 L/hour. An aqueous solution of nutrients prepared as below was added at a rate of 18 mL/minute. Moreover, a UASB was used as the anaerobic biological treatment tank, and an MBR was used as the aerobic biological treatment tank. The UASB was operated at a COD load of 10 $Kg/m^3$/day, and a retention time of 1.4 days. The reverse osmosis membrane separation unit (RO) was operated at a water recovery of 60%. In this operation, the entire amount of the RO concentrated brine 17 was added to the anoxic tank 1. Note that, the content of inorganic components including nitrogen and phosphorus in the plant wastewater was less than 0.005% by mass.

After the purification treatment of the plant wastewater reached a steady state, the plant wastewater 11, the primary treated water 14, the secondary treated water 15, the RO permeated water 16, and the RO concentrated brine 17 shown in FIG. 1 were sampled, and subjected to measurements of the respective concentrations of: oxygen-containing hydrocarbons excluding organic acids; organic acids; and hydrocarbons excluding oxygen-containing hydrocarbons, and measurements of $COD_{Cr}$ and BOD. Table 1 shows obtained results. Preparation of Aqueous Solution of Nutrients An aqueous solution of nutrients having a N/P ratio of 5/1 was prepared by dissolving 4.5 moles of urea (270 g) and 1 mole of ammonium hydrogen phosphate (132 g, (NH4)2HPO4) in 1 L of pure water.

TABLE 1

|  |  | Plant wastewater 11 | Primary treated water 14 | Secondary treated water 15 | RO permeated water 16 | RO concentrated brine 17 |
|---|---|---|---|---|---|---|
| oxygen-containing hydrocarbons excluding organic acids | mg/L | 15000 | 1360 | ND | ND | ND |
| organic acids | mg/L | 1000 | 80 | ND | ND | ND |
| hydrocarbons excluding oxygen-containing hydrocarbons | mg/L | <10 | 1360 | ND | ND | ND |
| $COD_{Cr}$ | mg/L | Approximately 15000 | Approximately 2500 | Approximately 120 | <3 | Approximately 160 |
| BOD | mg/L | Approximately 11000 | Approximately 1600 | ND | ND | ND |

Comparative Example

The RO concentrated brine 17 was not added to the anoxic tank 1. The feeding amount of the aqueous solution of nutrients was increased until the treatment performance of the purification treatment of the plant wastewater reached the equivalent level as that in Example. As a result, it was necessary to increase the feeding amount of the aqueous solution of nutrients to 30 mL/minutes in order to achieve the equivalent treatment performance as that in Example without recycling the RO concentrated brine 17.

The invention claimed is:

1. A method of treating plant wastewater discharged from any one of a chemical, petroleum, and petrochemical plant and containing an organic compound comprising:
   a pre-treatment step of
      feeding the plant wastewater to an anoxic tank,
      adding compounds containing a nitrogen component and a phosphorus component to the plant wastewater,
      performing an anaerobic biological treatment on the plant wastewater, and
      discharging the thus treated plant wastewater as pre-treated water;
   a primary treatment step of
      introducing the pre-treated water into an anaerobic biological treatment tank,
      performing an anaerobic biological treatment on the pre-treated water, thereby decomposing the organic compound into organic compounds of smaller molecular size and a mixture gas containing methane and carbon dioxide, and discharging the thus treated water as primary treated water;

a secondary treatment step of introducing the primary treated water into an aerobic biological treatment tank, performing an aerobic biological treatment on the primary treated water, and discharging the thus treated water through solid-liquid separation means as secondary treated water; and a tertiary treatment step of introducing at least a part of the secondary treated water into a reverse osmosis membrane separation unit, and separating the part of the secondary treated water into RO permeated water and RO concentrated brine, wherein at least a part of the RO concentrated brine is recycled to the anoxic tank.

2. The method according to claim 1, wherein the plant wastewater containing the organic compound is by-product water discharged from a plant using the Fischer-Tropsch synthesis process.

3. The method according to claim 1, wherein the anaerobic biological treatment tank is a treatment tank of an upflow anaerobic sludge blanket (UASB).

4. The method according to claim 1, wherein the aerobic biological treatment tank is an aerobic biological treatment tank including solid-liquid separation means (MBR).

5. The method according to claim 1, wherein at least a part of excess sludge discharged from the aerobic biological treatment tank is solubilized, and then added to the anoxic tank.

6. The method according to claim 1, wherein at least a part of the mixture gas containing methane and carbon dioxide and being discharged in the primary treatment step is recycled to the anoxic tank, and used for bubbling the plant wastewater thereto.

7. The method according to claim 1, wherein at least a part of the mixture gas containing methane and carbon dioxide and being discharged from the primary treatment step is recycled to the any one of the chemical, petroleum, and petrochemical plants.

8. A treatment system for plant wastewater discharged from any one of a chemical, petroleum, and petrochemical plant and containing an organic compound, the treatment system comprising:

an anoxic tank configured so that the plant wastewater is introduced into the anoxic tank, compounds containing a nitrogen component and a phosphorus component are added to the plant wastewater, thereby subjecting the plant wastewater to an anaerobic biological treatment, and wherein the thus treated plant wastewater is discharged from the anoxic tank as pre-treated water;

an anaerobic biological treatment tank communicating with the anoxic tank and being configured so that the pre-treated water is introduced into the anaerobic biological treatment tank and subjected to an anaerobic biological treatment, the organic compound in the pre-treated water is decomposed into organic compounds of smaller molecule and a mixture gas containing methane and carbon dioxide, and wherein the thus treated water is discharged from the anaerobic biological treatment tank as primary treated water;

an aerobic biological treatment tank communicating with the anaerobic biological treatment tank and configured so that the primary treated water is introduced into the aerobic biological treatment tank and subjected to an aerobic biological treatment, and wherein the thus treated water is discharged through a solid-liquid separator from the aerobic biological treatment tank as secondary treated water;

a reverse osmosis membrane separation unit communicating with the aerobic biological treatment tank and configured to separate the secondary treated water into RO permeated water and RO concentrated brine; and a recycling line to recycle at least a part of the RO concentrated brine to the anoxic tank.

9. The treatment system according to claim 8, wherein the anaerobic biological treatment tank is a treatment tank of an upflow anaerobic sludge blanket (UASB).

10. The treatment system according to claim 8, wherein the aerobic biological treatment tank is an aerobic biological treatment tank including solid-liquid separation means (MBR).

11. The treatment system according to claim 8, further comprising:

piping to recycle at least a part of excess sludge from the aerobic biological treatment tank to the anoxic tank; and a solubilizer provided in a middle of the piping that solubilizes the excess sludge.

12. The treatment system according to claim 8, further comprising:

piping to recycle to the anoxic tank a mixture gas containing methane and carbon dioxide and being discharged from the anaerobic biological treatment tank, wherein the anoxic tank includes a bubbler using the mixture gas.

\* \* \* \* \*

UNITED STATES PATENT AND TRADEMARK OFFICE
CERTIFICATE OF CORRECTION

PATENT NO. : 8,900,456 B2
APPLICATION NO. : 13/499330
DATED : December 2, 2014
INVENTOR(S) : Shinohara et al.

It is certified that error appears in the above-identified patent and that said Letters Patent is hereby corrected as shown below:

On the Title Page

Item (75) please change "Kazuhige" to --Kazushige--.

Signed and Sealed this
Sixteenth Day of June, 2015

Michelle K. Lee
*Director of the United States Patent and Trademark Office*